United States Patent
Yoshida et al.

(10) Patent No.: US 8,295,383 B2
(45) Date of Patent: Oct. 23, 2012

(54) RECEIVING APPARATUS AND MOBILE COMMUNICATION SYSTEM

(75) Inventors: Shousei Yoshida, Tokyo (JP); Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 456 days.

(21) Appl. No.: 12/524,065

(22) PCT Filed: Jan. 9, 2008

(86) PCT No.: PCT/JP2008/050157
§ 371 (c)(1),
(2), (4) Date: Sep. 14, 2009

(87) PCT Pub. No.: WO2008/090764
PCT Pub. Date: Jul. 31, 2008

(65) Prior Publication Data
US 2010/0046661 A1    Feb. 25, 2010

(30) Foreign Application Priority Data

Jan. 22, 2007    (JP) .................................. 2007-010977

(51) Int. Cl.
*H04B 7/02* (2006.01)
(52) U.S. Cl. ...................................................... 375/267
(58) Field of Classification Search .................... 375/267
See application file for complete search history.

(56) References Cited

U.S. PATENT DOCUMENTS

2002/0177447 A1    11/2002  Walton et al.
2003/0072382 A1*    4/2003  Raleigh et al. ................ 375/267

FOREIGN PATENT DOCUMENTS

| JP | 2004194262 A | 7/2004 |
|----|--------------|--------|
| JP | 2005514801 A | 5/2005 |
| JP | 2005536103 A | 11/2005 |
| JP | 2006507710 A | 3/2006 |
| JP | 2006203875 A | 8/2006 |

OTHER PUBLICATIONS

Yücek et al. (Noise plus interference power estimation in adaptive OFDM systems, Proc. IEEE Veh. Technol. Conf., p. 1278 , 2005).*
International Search Report for PCT/JP2008/050157 mailed Apr. 8, 2008.

(Continued)

*Primary Examiner* — Jaison Joseph

(57) ABSTRACT

A receiving apparatus is provided in which a single carrier signal is received by a plurality of receiving antennas, and multipath equalization and other cell interference suppression are carried out in a frequency domain at a same time. A plurality of antennas 1-1 to 1-N receives the single carrier signal. The DFT sections 3-1 to 3-N converts the reception signals into frequency domain signals. A channel estimating section 5 estimates a channel gain of a desired user signal by using pilot reception signals. An interference correlation matrix estimating section 6 estimates an interference correlation matrix from the pilot reception signals and a channel estimation value. A weight calculating section. A weight calculating section 7 receives the channel estimates and the interference correlation matrix and calculates equalization weights. An equalizing section 8 performs multipath equalization and other cell interference suppression to the desired user signal in a frequency domain. An IDFT section 9 converts an equalization signal into a signal in a time domain.

25 Claims, 12 Drawing Sheets

OTHER PUBLICATIONS

D. Falconer et al., "Frequency Domain Equalization for Single-Carrier Broadband Wireless Systems", IEEE Communication Magazine, vol. 40, No. 4, Apr. 2002, p. 58-66.

Qualcomm Europe, "System Analysis for UL SIMO SC-FDMA", 3GPP TSG-RAN WG1 #45, R1-061525, May 8-12, 2006.

Japanese Office Action for JP2008-555013 mailed on Jul. 24, 2012.

Masayuki Kimata and with Other one Person, Review of Frequency Region Demodulation Method in Upward Single Carrier IFDMA, Collection of Lectures and Papers in 2006 General Symposium of the Institute of Electrons, Information and Communication Engineers, Communication 1, Mar. 8, 2006, p. 388, B-5-36.

Masayuki Kimata and with Other One Person, Property Improvement of Frequency Equalizer in Upward Broadband IFDMA method Collection 1 of Lecture and Papers in 2005 Communication Society Symposium of the Institute of Elections, Information and Communication Engineers, Sep. 7, 2005, p. 403, B-5-4.

Masayuki Kimata and with Other One Person, Review of Equalization of Frequency Region of Different Cell Interference Suppression Type in Upward SC-FDMA, Collection of Lectures and Papers in 2007 General Symposium of the Institute of Elections, Information and Communication Engineers, Communication 1, Mar. 7, 2007, p. 472, B-5-58.

* cited by examiner

RECEIVING APPARATUS AND MOBILE COMMUNICATION SYSTEM

TECHNICAL FIELD

The present, invention relates to a receiving apparatus and a mobile communication system, and more particularly, relates to a receiving apparatus and a mobile communication system in which a single carrier signal is received by a plurality of receiving antennas.

This present patent application is the National Phase of PCT/JP2008/050157, filed Jan. 9, 2008, which claims a priority on convention based on Japanese Patent Application No. 2007-010977 filed Jan. 22, 2007, and the disclosure thereof is incorporated herein by reference.

BACKGROUND ART

In an uplink wireless system of a next generation mobile communication, a high transmission power efficiency needs to be attained in order to enlarge a communication area. Thus, a single-carrier (SC) system in which a peak to average power ratio (PAPR) is low is considered to be dominant. Also, in the next generation mobile communication, it is important to attain a high-speed data transmission. When an SC signal is used to carry out the high-speed data transmission, a problem of an inter-symbol interference (multipath interference) is caused. As a method of easily suppressing this multipath interference, a linear equalization is known. A frequency domain equalization is considered in which an equalizing process is executed in a signal process of a frequency domain so that an operational processing amount can be largely reduced. Also, in order to improve reception quality, a method is effective in which the SC signal is received by a plurality of receiving antennas, the respective reception signals are equalized, and an antenna diversity combining is carried out.

The frequency domain equalization typically uses pilot signals to estimate channel gains in a frequency domain and to calculate equalization weights. FIG. 1 shows one example of a format of a wireless frame signal when the frequency domain equalization is used. The wireless frame signal contains a plurality of blocks of a pilot signal and a data signal. In the frame shown in FIG. 1, a pilot signal block is located at the head and then a plurality of data signal blocks follow, A cyclic prefix (CP) is added to the head of each block, in order to avoid interference from a previous block at a time of a DFT (Discrete Fourier Transform) process. The CP is generated by copying a final portion data of each block to the foremost portion.

FIG. 2 shows a configuration of a conventional receiving apparatus. In the conventional receiving apparatus, the SC signal is received by N (N is an integer of 2 or more) receiving antennas, and then the multipath equalization and the antenna diversity combining are carried out in a frequency domain signal process. The conventional receiving apparatus contains receiving antennas 101-1 to 101-N, CP removing sections 102-1 to 102-N, DFT sections 103-1 to 103-N, reception filters 104-1 to 104-N, a channel estimating section 105, a noise power estimating section 106, a weight calculating section 107, an equalizing section 108 and an IDFT (Inverse Discrete Fourier Transform) section 109.

The receiving antennas 101-1 to 101-N are connected to the CP removing sections 102-1 to 102-N, respectively. The CP removing sections 102-1 to 102-N are connected to the DFT sections 103-1 to 103-N, respectively. The DFT sections 103-1 to 103-N are connected to the reception filters 104-1 to 104-N, respectively. The reception filters 104-1 to 104-M are connected to the channel estimating section 105, the noise power estimating section 106 and the equalizing section 108. The channel estimating section 105 is connected to the noise power estimating section 106 and the weight calculating section 107. The noise power estimating section 106 is connected to the weight calculating section 107. The weight calculating section 107 is connected to the equalizing section 108. The equalizing section 108 is connected to the IDFT section 109.

Each of the receiving antennas 101-1 to 101-N receives the SC signal. The CP removing sections 102-1 to 102-N receive the reception signals of the respective antennas and remove signal portions corresponding to the CP portions. The DFT sections 103-1 to 103-N receive the reception signals from which the CP portions have been removed, from the CP removing sections 102-1 to 102-N, and carry out the DFT processes of $N_{DFT}$ points ($N_{DFT}$ is an integer of 2 or more), and output, frequency domain signals transformed from the reception signals. The reception filters 104-1 to 104-N carry out bandwidth limitation of the frequency domain signals and carry out user separation and noise suppression. Typically, raised cosine roll-off filters (including a roil-off rate 0) are used in the reception filters 104-1 to 104-N. In the configuration shown in FIG. 2, the filtering of the frequency domain signal is carried out in the frequency domain signal process. However, the signal process of a time domain may be carried out prior to a DFT process.

The channel estimating section 105 carries out a correlating process between pilot reception signals and pilot reference signals in the frequency domain and consequently estimates channel gains of a desired user signal. FIG. 3 is a block diagram showing a configuration of the channel estimating section 105. The channel estimating section 105 contains a DFT section 111, a transmission/reception filter 112, a pilot reference signal generating section 113, a correlation calculating section 114 and a noise suppressing section 115.

The DFT section 111 is connected to the transmission/reception filter 112. The transmission/reception filter 112 is connected to the pilot reference signal generating section 113. The pilot reference signal generating section 113 is connected to the correlation calculating section 114. The correlation calculating section 114 is connected to the noise suppressing section 115.

The DFT section 111 performs a DFT process on a pilot code of a desired user signal to transform into the frequency domain signal. The transmission/reception filter 112 is applied to a portion of the frequency domain signal corresponding to the pilot code. The transmission/reception filter 112 is not required in case of the roll-off rate 0. The pilot reference signal generating section 113 uses the output of the transmission/reception filter 112 to generate a pilot reference signal that is used in correlation calculation with a pilot reception signal. In the pilot reference signal generating section 113, there are used a zero forcing (ZF) method of perfectly cancelling the code characteristics of the pilot reception signal, a minimum mean squared error (MMSE) method of suppressing noise increase in the correlation calculation, or a clipping method, A pilot reference signal $X(k)$ ($1 \cdot k \cdot N_{DFT}$) in a subcarrier k when the ZF is used is represented by the following equation.

$$X(k) = \frac{C^*(k)}{|C(k)|^2} \qquad (1)$$

where $C(k)$ indicates a pilot code characteristics of the output, of the transmission/reception filter 112, and a superscript * indicates a complex conjugate. The processes of the DFT section 111, the transmission/reception filter 112 and the pilot reference signal generating section 113 are sufficient to be carried out only once prior to the communication with a desired user. Also, a method of calculating a plurality of pilot reference signals in advance and storing in a memory and then selecting the pilot reference signal on the basis of a user is considered. The correlation calculating section 114 estimates channel gains in accordance with correlation calculation between the pilot reception signals and the pilot reference frequency domain signals. A channel estimation value vector H(k) (1·k·$N_{DFT}$) to the subcarrier k is calculated by the following equation:

$$H(k)=X(k)P(k) \quad (2)$$

where P(k) indicates a pilot reception signal vector of the outputs of the reception filters 104-1 to 104-N. The noise suppressing section 115 suppresses noise in a channel estimation value of the output of the correlation calculating section 114 and improves the precision of the channel estimation value. As a specific operating method of the noise suppressing section 115, there are a method of calculating movement average of adjacent subcarriers, a method of transforming the channel estimation value into a time domain through an IDFT process once, and returning to the frequency domain by a DFT process after the removal of noise paths.

The noise power estimating section 106 estimates noise power from the channel estimation values of the pilot reception signal and the desired user signal in the frequency domain. FIG. 4 is a block diagram showing a configuration of the noise power estimating section 106. The noise power estimating section 106 contains a DFT section 121, a transmission/reception filter 122, a pilot signal replica generating section 123, a subtracting section 124, a noise power calculating section 125 and a subcarrier averaging section 126.

The DFT section 121 is connected to the transmission/reception filter 122. The transmission/reception filter 122 is connected to the pilot signal replica generating section 123. The pilot signal replica generating section 123 is connected to the subtracting section 124. The subtracting section 124 is connected to the noise power calculating section 125. The noise power calculating section 125 is connected to the subcarrier averaging section 126.

The DFT section 121 performs a DFT process on the pilot code of the desired user signal to transform into a frequency domain signal. The transmission/reception filter 122 is applied to a portion of the frequency domain signal of the pilot code. The transmission/reception filter 122 is not required in case of the roll-off rate 0. The processes of the DFT section 121 and the transmission/reception filter 122 may be carried out only once prior to the communication with the desired user. Also, a method is considered of calculating a plurality of filter output signals in advance, storing in the memory and selecting the filter output signal on the basis of the user. The pilot signal replica generating section 123 multiplies the output of the transmission/reception filter 122 and the channel estimation value to generate a pilot signal replica. The subtracting section 124 subtracts the pilot signal replica from the pilot reception signal in the frequency domain. The noise power calculating section 123 calculates power of the output of the subtracting section 124. The subcarrier averaging section 126 averages the noise powers over the subcarriers. Typically, the noise spectral is white Gaussian noise. Thus, a summation of the noise powers for all of subcarriers $N_{DFT}$ is averaged by the number $N_{NB}$ of subcarriers ($N_{NB}$ is an integer of 2 or more) corresponding to the noise bandwidth of the reception filter. A noise power $\sigma^2$ is calculated by the following equation by using the pilot reception signal vector P(k), the channel estimation value vector H(k), the pilot code characteristics C(k), and the number $N_{NB}$ of subcarriers corresponding to the noise bandwidth of the reception filter:

$$\sigma^2 = \frac{1}{N \times N_{NB}} \sum_{k=1}^{N_{DFT}} \|p(k) - H(k)C(k)\|^2 \quad (3)$$

The weight calculating section 107 are supplied with the channel estimation value of the desired user signal and the noise power and calculates the equalization weights. Typically, MMSE is used in the weight calculating section 107. MMSE weights W(k) (1·k·$N_{DFT}$) in a subcarrier m is calculated by the following equation by using the channel estimation value vector H(k) and the noise power $\sigma^2$:

$$W(k)=H^H(k)[H(k)H^H(k)+\sigma^2 I]^{-1} \quad (4)$$

where a superscript H indicates a Hermite conjugate, and I indicates a unit matrix. The equalizing section 108 receives the equalization weights calculated by the weight calculating section 107 and the reception signals bandwidth-limited by the reception filters 104-1 to 104-N, and they are multiplied for each subcarrier, and the multipath equalization of the reception signal and the antenna diversity combining are carried out in the frequency domain. When the data reception signal vector of the outputs of the reception filters 104-1 to 104-N is defined as D(k) (1·k·$N_{DFT}$) and the weights calculated by the weight calculating section 107 is defined as W(k), an equalization signal Y(k) (1·k·$N_{DFT}$) of the output of the equalizing section 108 is represented by the following equation:

$$Y(k)=W(k)D(k) \quad (5)$$

The IDFT section 109 receives the equalization frequency domain signal that is the output of the equalizing section 108, and performs an IDFT process on $N_{IDFT}$ points ($N_{IDFT}$ is an integer of 2 or more) to transform into a signal of the time domain, and then outputs a demodulation signal.

The foregoing frequency domain equalization is also considered in the following document; "Frequency Domain Equalization for Single-Carrier Broadband Wireless Systems" (IEEE Commun. Mag., vol. 40, No. 4, pp.) by D. D. Falconer, S. L. Ariyavisitakul, A. Benyamin-Seeyar, and E. Eidson.

As mentioned above, in the conventional receiving apparatus, the SC signal is received by the plurality of receiving antennas, and the multipath equalization and the antenna diversity combining are carried out in the frequency domain. Consequently, in the isolated cell environment in which only the desired user signal exists, the superior performance can be achieved. However, in the multi-cell environment such as a mobile communication system, the users using the same frequency channel exist in the adjacent cell, and the signals of the users result in the interferences (other cell interferences). In the conventional receiving apparatus, those interferences are regarded as the noises, and the optimization is carried out in accordance with the MMSE. However, another cell interference is not always suppressed. Thus, when there is a severe other cell interference, the reception performance is degraded.

DISCLOSURE OF INVENTION

An object of the present invention is to provide a receiving apparatus in which in a mobile communication system, an SC signal is received by a plurality of receiving antennas, and multipath equalization of a desired user signal and other cell interference suppression are carried out in a frequency domain at a same time.

A mobile communication system according to the present invention contains a plurality of mobile stations and a base station. Here, the base station can communicate with the plurality of mobile stations with an SC (Single Carrier) system at a same time.

Also, the base station contains a first receiving apparatus. Here, the first receiving apparatus carries out an SIMO (Single Input Multiple Output) communication with a desired mobile station of the plurality of mobile stations.

Moreover, the first receiving apparatus contains a plurality of first front stage function means, a first, channel estimating means, a first interference correlation matrix estimating means, and a first back stage function means. Here, the plurality of first former stage function means are configured to receive the SC signal by the plurality of mobile stations and output a plurality of frequency domain signals which are separated from reception signals from the plurality of mobile stations, respectively. The first channel estimating means is configured to estimate and output the channel gains, for each of the plurality of frequency domain signals. The first interference correlation matrix estimating means is configured to estimate and output the interference correlation matrix in accordance with the plurality of frequency domain signals and the estimation values of the channel gains. The first back stage function means is configured to output a demodulation signal in accordance with the estimation values of the channel gains and estimation values of the interference correlation matrix.

A mobile communication method according to the present invention contains: (a) a base station carrying out an SIMO communication with a desired user mobile station by using a first receiving method; and (b) a plurality of user mobile stations communicating with the base station by using a single carrier system at a same time. Here, the first receiving method contains; (a-1) N (N is an integer of 2 or more) receiving antennas receiving a single carrier signal; (a-2) DFT sections transforming the reception signals into frequency domain signals; (a-3) a channel estimating section using pilot reception signals to estimate the channel gains of the desired user signal; (a-4) an interference correlation matrix estimating section estimating an interference correlation matrix from the pilot reception signals and the estimation values of the channel gains; (a-5) a weight calculating section calculating the equalization weights from the estimation values of the channel gains and the estimation values of the interference correlation matrix; (a-6) an equalizing section performing multipath equalization and interference suppression on the desired user signal to output an equalization signals; and (a-7) an IDFT section transforming the equalization signals into a signal of a time domain.

BEST MODE FOR CARRYING OUT THE INVENTION

Hereinafter, a receiving apparatus and a mobile communication system according to the present invention will be described in detail with reference the attached drawings.

First Exemplary Embodiment

Figure 1:
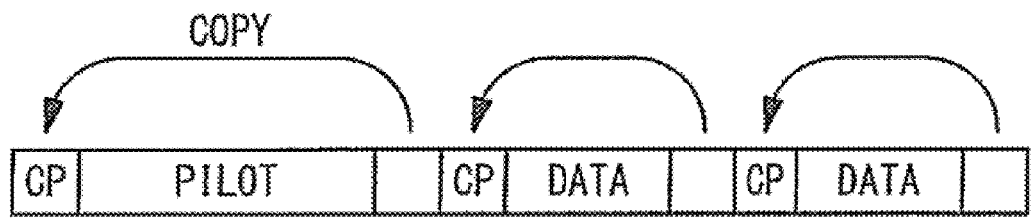
FIG. 1 is a diagram showing one example of a wireless frame format when frequency domain equalization is applied.
Figure 2:
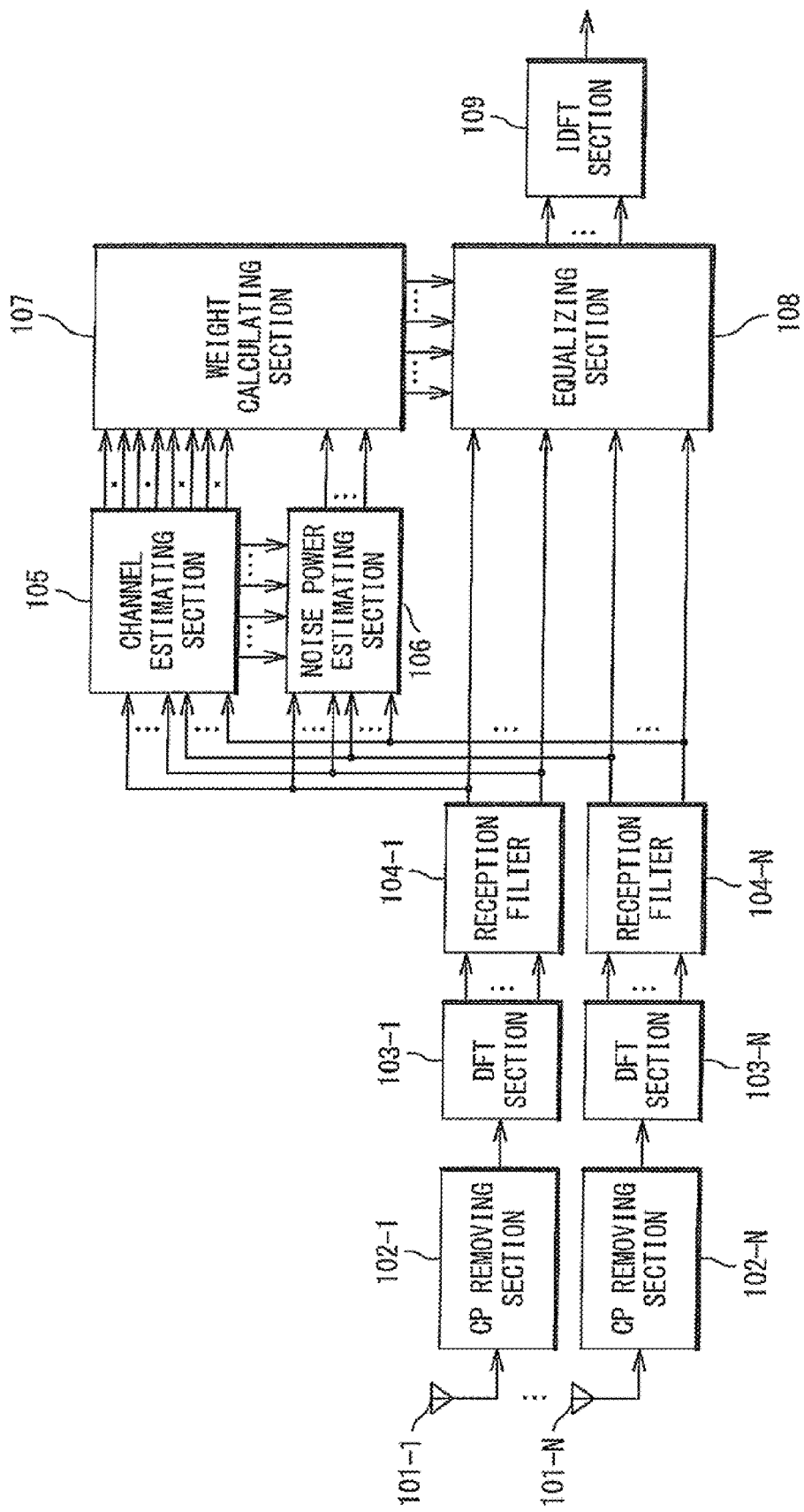
FIG. 2 is a block diagram showing a configuration of a conventional receiving apparatus.
Figure 3:
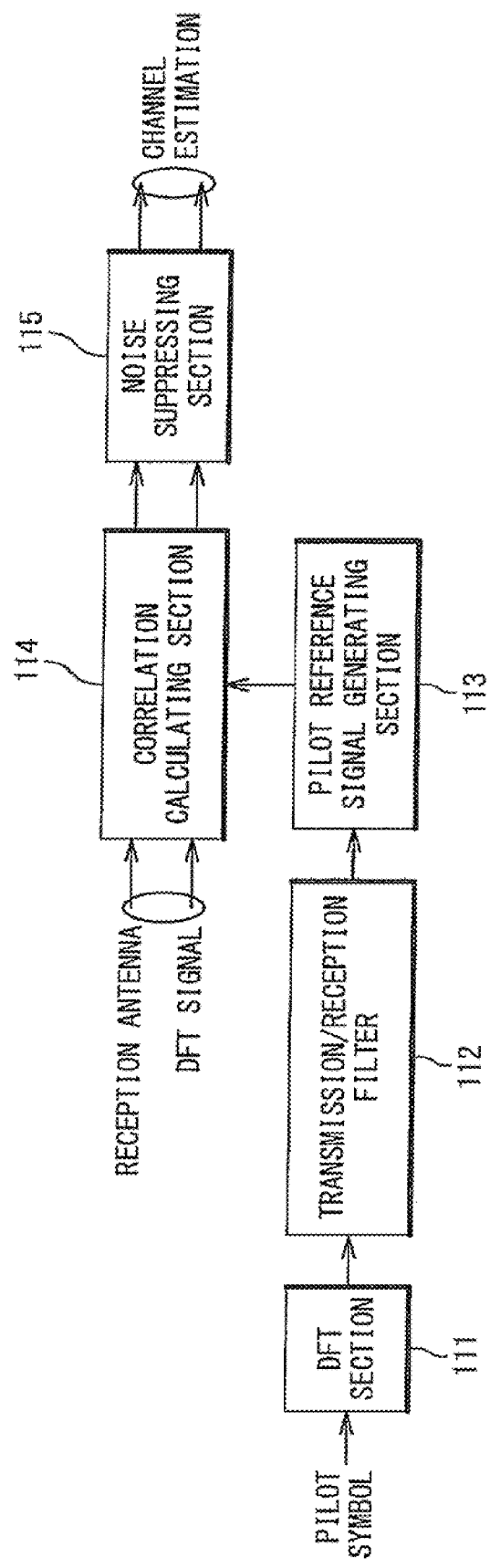
FIG. 3 is a block diagram showing a configuration example of a channel estimating section 5 or 105.
Figure 4:
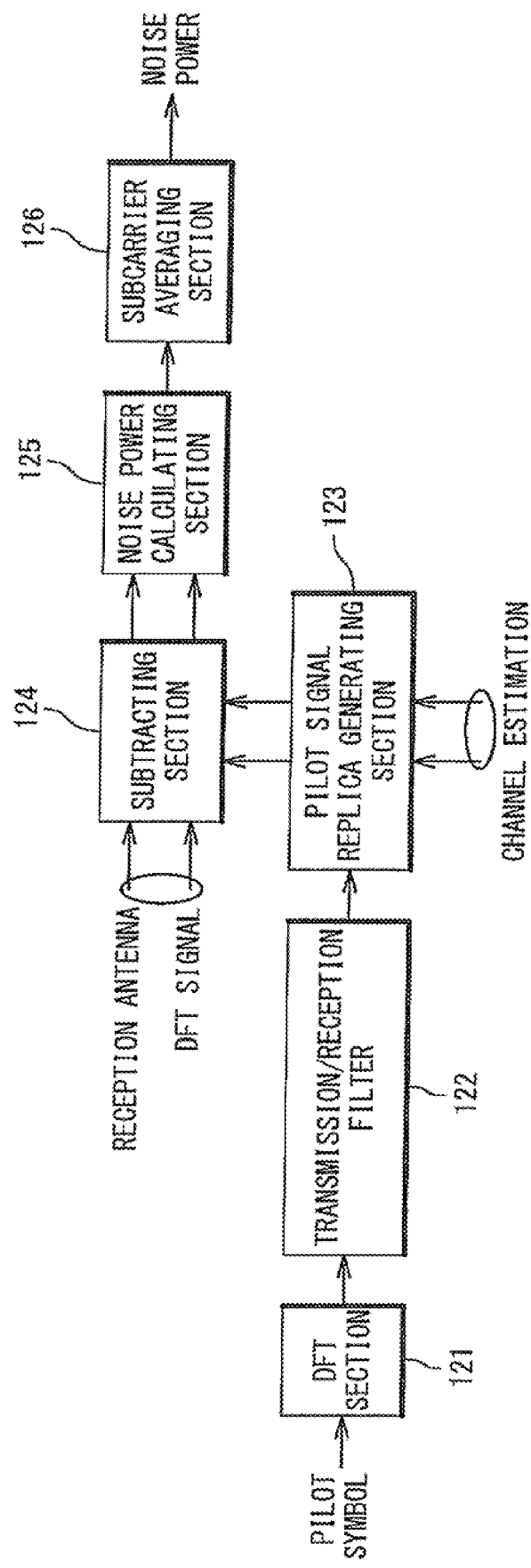
FIG. 4 is a block diagram showing a configuration example of a noise power estimating section 106.
Figure 5:
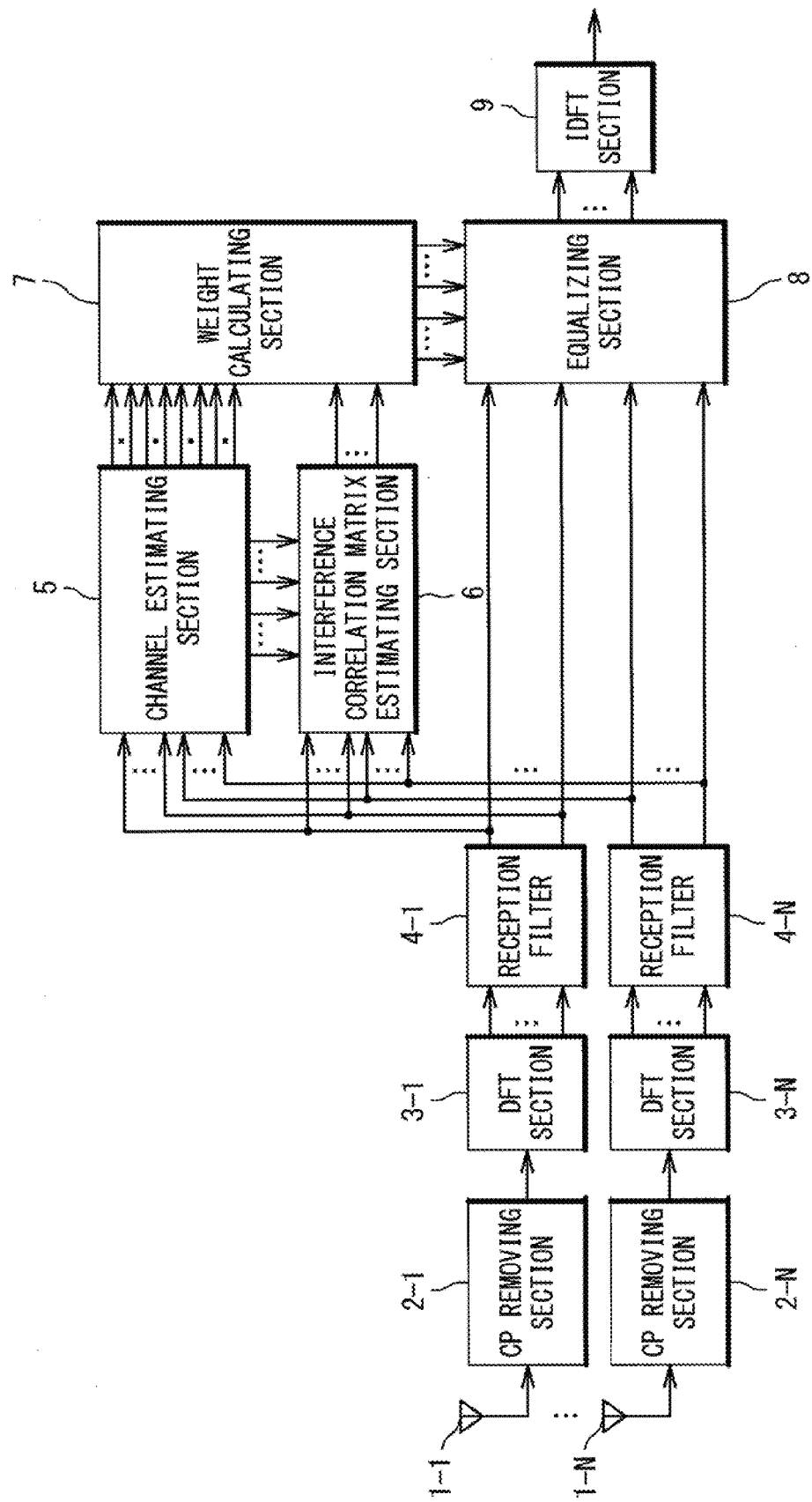
FIG. 5 is a block diagram showing a configuration of a receiving apparatus according to a first exemplary embodiment of the present invention.

The receiving apparatus and the mobile communication system according to a first exemplary embodiment of the present invention will be described below with reference the drawings. FIG. 5 is a block diagram showing a configuration of the receiving apparatus according to the first exemplary embodiment of the present invention. The first exemplary embodiment relates to a receiving apparatus of a one-transmission antenna multiple-receiving antenna (SIMO: Single Input Multiple Output) communication. In the receiving apparatus of the present invention, an SC signal is received by N (N is the integer of 2 or more) receiving antennas and then multipath equalization and other cell interference suppression are carried out through a signal process in a frequency domain. The receiving apparatus of the present invention contains receiving antennas 1-1 to 1-N, CP removing sections 2-1 to 2-N, DFT sections 3-1 to 3-N, reception filters 4-1 to 4-N, a channel estimating section 5, an interference correlation matrix estimating section 6, an weight calculating section 7, an equalizing section 8 and an IDFT section 9.

The receiving antennas 1-1 to 1-N are connected to the CP removing sections 2-1 to 2-N, respectively. The CP removing sections 2-1 to 2-N are connected to the DFT sections 3-1 to 3-N, respectively. The DFT sections 3-1 to 3-N are connected to the reception filters 4-1 to 4-N, respectively. The reception filters 4-1 to 4-N are connected to the channel estimating section 5, the interference correlation matrix estimating section 6 and the equalizing section 8. The channel estimating section 5 is connected to the interference correlation matrix estimating section 6 and the weight calculating section 7. The interference correlation matrix estimating section 6 is connected to the weight calculating section 7. The weight calculating section 7 is connected to the equalizing section 8. The equalizing section 8 is connected to the IDFT section 9.

In order to carry out the multipath equalization and the other cell interference suppression at a same time in the frequency domain, the receiving apparatus of the present invention carries out a calculation by separating a correlation matrix, which is used in an equalization weight calculation, into a correlation matrix determined from a channel estimation value of a desired user signal and an interference correlation matrix determined by subtracting a replica of the desired user signal from the reception signals.

Each of the receiving antennas 1-1 to 1-N receives the SC signal. The CP removing sections 2-1 to 2-N receive the reception signals from the respective antennas and remove the signal portions corresponding to the CP portion. The DFT sections 3-1 to 3-N receive the reception signals from which the CP portions are removed by the CP removing sections 2-1 to 2-N and carry out DFT processes of the $N_{DFT}$ points ($N_{DFT}$ is the integer of 2 or more) and output the reception signals transformed into frequency domain signals. The reception filters 4-1 to 4-N carry out the bandwidth limitations of the frequency domain reception signals and carry out the user separation and the noise suppression. Typically, the raised cosine roll-off filters (including the roll-off rate 0) are used in the reception filters 4-1 to 4-N. However, they are not limited thereto. In the configuration of FIG. 5, the filtering of the reception signals is carried out in the signal process in the frequency domain. However, it may be carried out by the signal process of the time domain prior to the DFT sections 3-1 to 3-N.

The channel estimating section 5 carries out a correlating process between the pilot reception signals and the pilot reference frequency domain signals and consequently estimates the channel gains of the desired user signal. The channel estimating section 5 contains a DFT section 111, a transmission/reception filter 112, a pilot reference signal generating section 113, a correlation calculating section 114 and a noise suppressing section 115. The DFT section 111 performs the DFT process on the pilot code of the desired user signal to transform into the frequency domain signals. The transmission/reception filter 112 is applied to a portion of the frequency domain signal corresponding to the pilot code. The transmission/reception filter 112 is not required in case of the roll-off rate 0. The pilot reference signal generating section 113 uses the output of the transmission/reception filter 112 to generate a pilot reference signal that is used in the correlation calculation with the pilot reception signal. Preferably, the pilot reference signal generating section 113 uses ZF of perfectly cancelling the code characteristics of the pilot reception signal or the MMSE of suppressing the noise increase in the correlation calculation or the clipping method. The pilot reference signal $X(k)$ ($1 \cdot k \cdot N_{DFT}$) in the subcarrier k when the ZF is used is represented by the equation (1). The processes of the DFT section 111, the transmission/reception filter 112 and the pilot reference signal generating section 113 are sufficient to be carried out only once prior to the communication with the desired user. Also, the method of calculating the plurality of pilot reference signals in advance and storing in the memory and then selecting the pilot reference signal on the basis of the user may be considered.

The correlation calculating section 114 estimates the channel gains in accordance with the correlation calculation between the pilot reference signals and pilot reception signals in the frequency domain. The channel estimation value vector $H(k)$ ($1 \cdot k \cdot N_{DFT}$) of the subcarrier k is calculated by use of the equation (2). The noise suppressing section 115 suppresses noise in a channel estimation value from the output of the correlation calculating section 114 and improves the precision of the channel estimation value. The noise suppressing section 115 uses a method of performing the movement average of the adjacent subcarriers, and a method of transforming the channel estimation value into the time domain by the IDFT process once, and returning to the frequency domain by the DFT process, after the removal of the noise paths.

Figure 6:
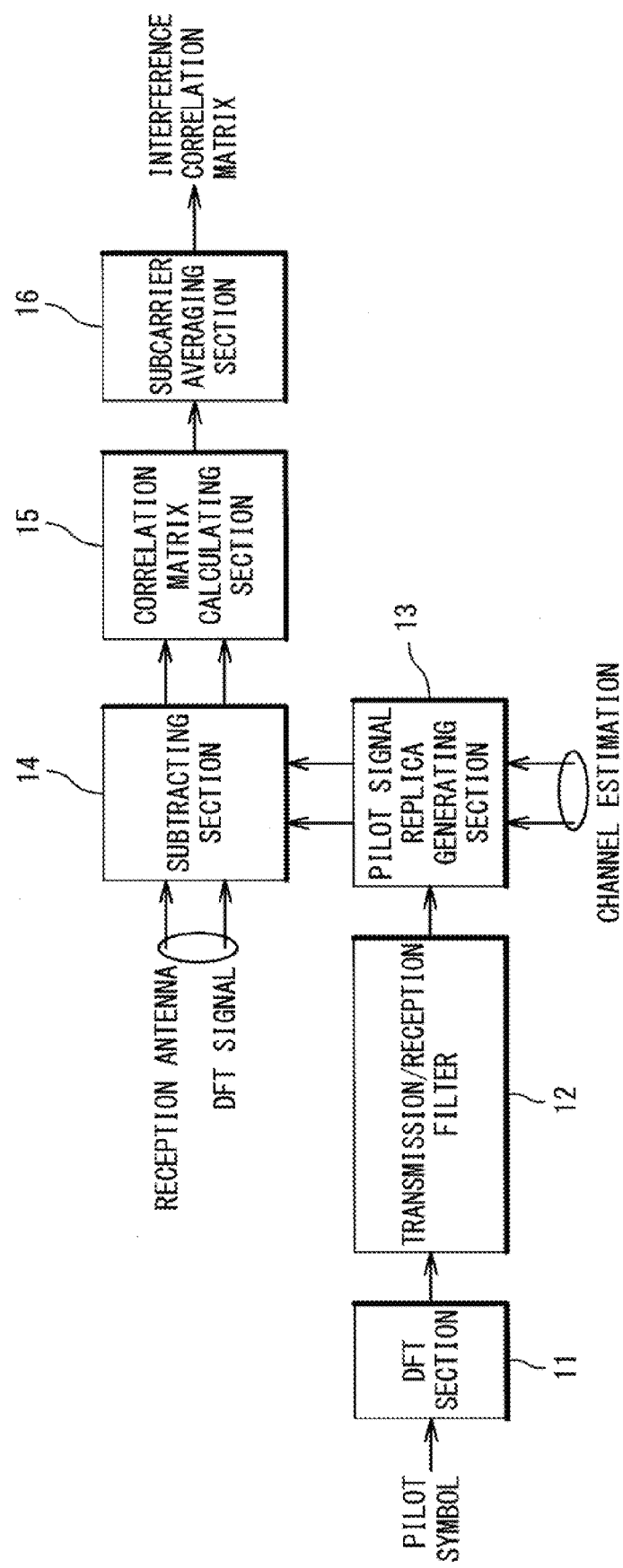
FIG. 6 is a block diagram showing a configuration example of an interference correlation matrix estimating section 6.

FIG. 6 is a block diagram showing the configuration example of the interference correlation matrix estimating section 6. The interference correlation matrix estimating section 6 estimates the interference correlation matrix from the pilot reception signals and the channel estimation value of the desired user signal in the frequency domain. The interference correlation matrix estimating section 6 contains a DFT section 11, a transmission/reception filter 12, a pilot signal replica generating section 13, a subtracting section 14, a correlation matrix calculating section 15 and a subcarrier averaging section 16.

The DFT section 11 is connected to the transmission/reception filter 12. The transmission/reception filter 12 is connected to the pilot signal replica generating section 13. The pilot signal replica generating section 13 is connected to the subtracting section 14. The subtracting section 14 is connected to the correlation matrix calculating section 15. The correlation matrix calculating section 15 is connected to the subcarrier averaging section 16.

The DFT section 11 performs the DFT process on the pilot code of the desired user signal to transform into a frequency domain signals. The transmission/reception filter 12 is applied to the signal of the pilot code in the frequency domain. The transmission/reception filter 12 is not required in case of the roll-off rate 0. The processes of the DFT section 11 and the transmission/reception filter 12 are sufficient to be carried out only once prior to the communication with the desired user. Also, the method of calculating the plurality of filter output signals in advance and storing in the memory and then selecting the filter output signal on the basis of the user is considered. The pilot signal replica generating section 13 multiplies the output of the transmission/reception filter 12 by the channel estimation value and generates a pilot signal replica. The subtracting section 14 subtracts the pilot signal replica from the pilot reception frequency domain signal. The correlation matrix calculating section 15 calculates the correlation matrix from the output of the subtracting section 14. The subcarrier averaging section 16 averages the respective elements of the correlation matrix over the subcarriers. In order to improve the precision of the correlation matrix, the average is desired to be calculated for the many subcarriers. However, the interference signal receives a frequency selective fading. Thus, when the subcarrier average is tried beyond a coherent bandwidth, the interference suppression effect is reduced. Thus, the interference correlation matrix is averaged by subcarrier number $N_{CB}$ ($N_{CB}$ is an integer of 2 or more) substantially corresponding to the coherent band so that the performance is optimized. An interference correlation matrix $R_I(k)$ ($1 \cdot k \cdot N_{DFT}$) is calculated by the following equation by using the pilot reception signal vector $P(k)$, the channel estimation value vector $K(k)$, the pilot code characteristics $C(k)$, and the subcarrier number $N_{CB}$ corresponding to the coherent bandwidth.

$$R_I(k) = \frac{1}{N_{CB}} \sum_{i=k-(N_{CB}-1)/2}^{k+(N_{CB}-1)/2} [P(i) - H(i)C(i)][P(i) - H(i)C(i)]^H \quad (6)$$

The channel estimation value of the desired user signal and the interference correlation matrix are supplied to the weight calculating section 7, and the equalization weights are calculated. The MMSE weights $W(k)$ ($1 \cdot k \cdot N_{DFT}$) in the subcarrier k are calculated by the following equation by using the channel estimation value vector H(k), the correlation matrix R(k) and the interference correlation matrix $R_I(k)$:

$$R(k) = H(k)H^H(k) + R_I(k) \quad (7a)$$

$$W(k) = H^H(k)R^{-1}(k) \quad (7b)$$

$$= H^H(k)[H(k)H^H(k) + R_I(k)]^{-1} \quad (7c)$$

The equalizing section 8 receives the equalization weights calculated by the weight calculating section 7 and the reception signals whose bandwidth is limited by the reception filters 4-1 to 4-N, and they are multiplied for each subcarrier. Consequently, the equalizing process of the reception signals is carried out in the frequency domain. Equalization signals Y(k) (1·k·$N_{DFT}$) outputted from the equalizing section 8 are calculated by the equation (5). The IDFT section 9 receives the equalization frequency domain signals that are outputted from the equalizing section 8, and performs an IDFT process of the $N_{IDFT}$ points ($N_{IDFT}$ is the integer of 2 or more), to transform into a signal of a time domain and then outputs the demodulation signal.

In the receiving apparatus in this exemplary embodiment, the correlation matrix used in the equalization weight calculation is calculated by separating into the correlation matrix determined from the channel estimation values of the desired user signal and the interference correlation matrix determined by subtracting the replica of the desired user signal from the reception signals. Thus, since the multipath equalization and the other cell interference suppression can be carried out at the same time in the frequency domain, the superior reception performance is achieved.

Figure 7:
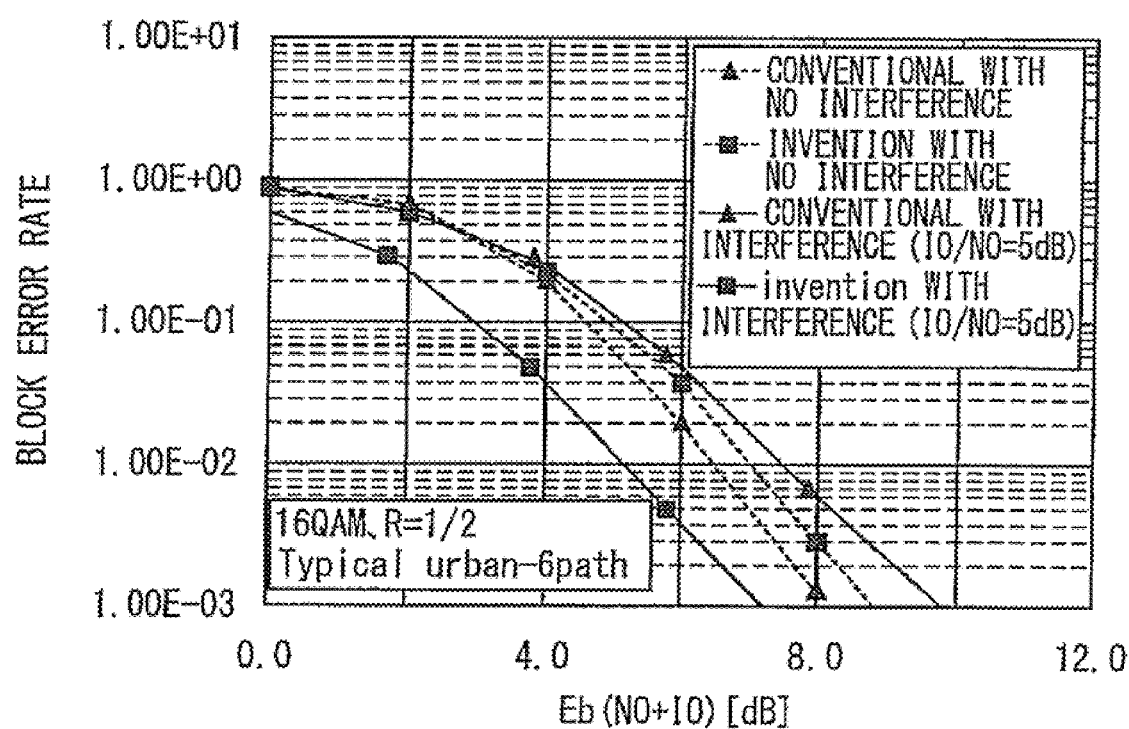
FIG. 7 is graphs showing a block error rate performance of the receiving apparatus of the present invention.

FIG. 7 is a diagram showing a block error rate performance of the receiving apparatus of the present invention. When there is an interference from another cell, a required bit energy to noise interference power ratio (Eb/NO+IO) is reduced in the receiving apparatus of the present invention. However, when there is not the other cell interference, the performance of the receiving apparatus of the present invention is slightly degraded as compared with the conventional receiving apparatus. This is because the noise power estimation can get a subcarrier average number that is greater than the interference correlation matrix estimation, and the precision is better. For this reason, when the value of the other cell interference can be estimated, a method of selecting the interference correlation matrix $R_I(k)$ and a noise power matrix $\sigma^2 I$ on the basis of the value of the other cell interference in the equalization weight, calculation may be used.

Figure 8:
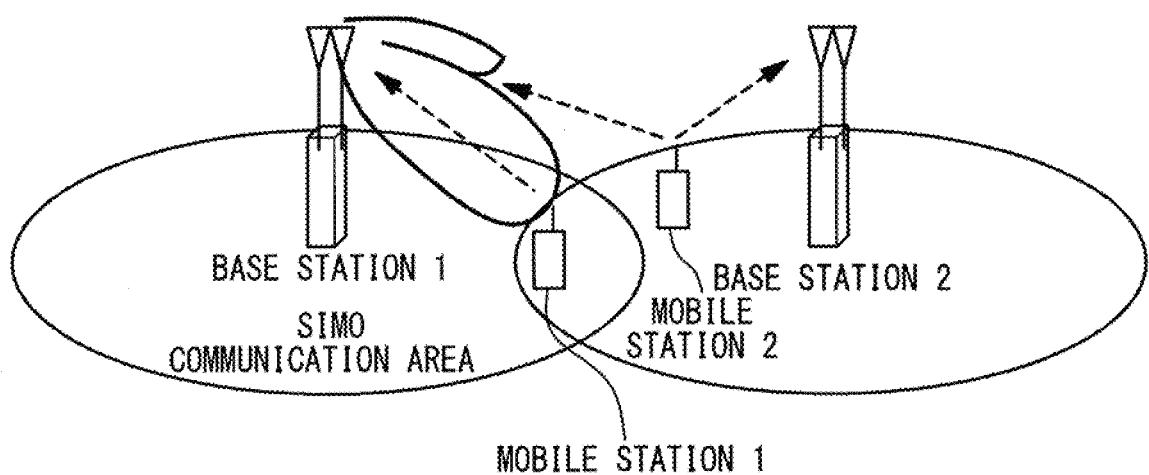
FIG. 8 is a diagram showing a mobile communication system that uses the receiving apparatus of the present invention.

FIG. 8 is a diagram showing a mobile communication system that uses the receiving apparatus in this exemplary embodiment. In the uplink of the mobile communication system, a mobile station 1 is connected to a base station 1. Then, the one-transmission antenna multiple-reception antenna (SIMO: Single Input Multiple Output) communication is carried out in accordance with the SC system. When the base station 1 receives the signal of the mobile station 1, the signal of a mobile station 2, which is connected to a base station 2 in an adjacent cell and carries out a communication by using the same frequency channel, results in interference. When receiving the signal of the mobile station 1, the base station 1 uses the receiving apparatus in this exemplary embodiment so that the multipath equalization of the signal of the mobile station 1 and the interference suppression of the mobile station 2 are carried out at a same time. Typically, in the MMSE, when the number of the receiving antennas in the base station is defined as N, the interferences of the mobile stations in the (N−1) other cells can be suppressed.

Second Exemplary Embodiment

A second exemplary embodiment of the present invention will be described below. The second exemplary embodiment relates to the receiving apparatus of a multiple-transmission antenna multiple-reception antenna (MIMO: Multiple Input Multiple Output) communication.

Figure 9:
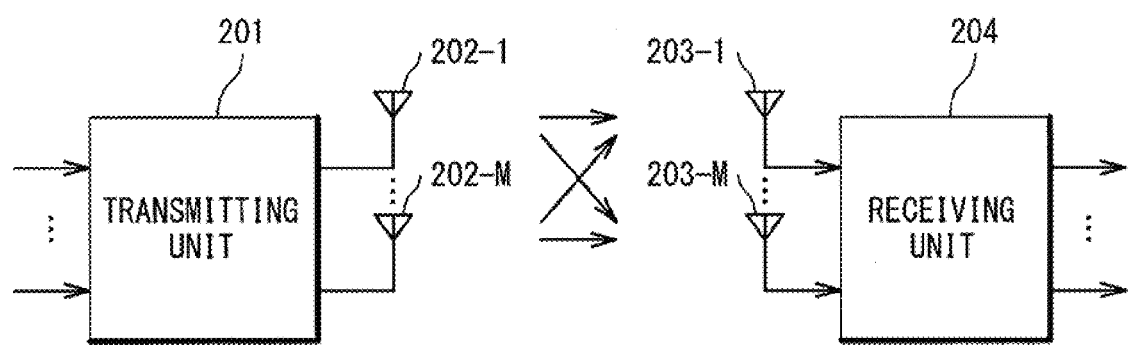
FIG. 9 is a block diagram showing a configuration of an MIMO transmission/reception system.

FIG. 9 is a diagram showing the schema of the MIMO transmission/reception system. In the MIMO transmission/reception system, when the number of the transmission antennas is defined as M (M is an integer of 2 or more) and the number of the reception antennas is defined as N (N is an integer of 2 or more), the transmission side contains a transmitting unit 201 and transmission antennas 202-1 to 202-M, and the reception side contains reception antennas 203-1 to 203-N and a receiving unit 204. The plurality of transmission antennas 202-1 to 202-M transmit data signals that are different although the same frequency is used. The plurality of reception antennas 203-1 to 203-W are used to receive the data signals. Thus, without any increase in a transmission bandwidth, it is possible to carry out the fast data transmissions proportional to the number of the transmission antennas. In the receiving apparatus 204, the respective data signals transmitted from the plurality of transmission antennas 202-1 to 202-M are required to be separated from the signals received by the plurality of reception antennas 203-1 to 203-N. As the MIMO signal separating system, an MMSE-SIC (Successive Interference Canceller) system for carrying out the removal of the antenna interference replica and the MMSE equalization in an order from the transmission antenna signal of a high level is effective because the operation process amount is small and the performance is superior.

Figure 10:
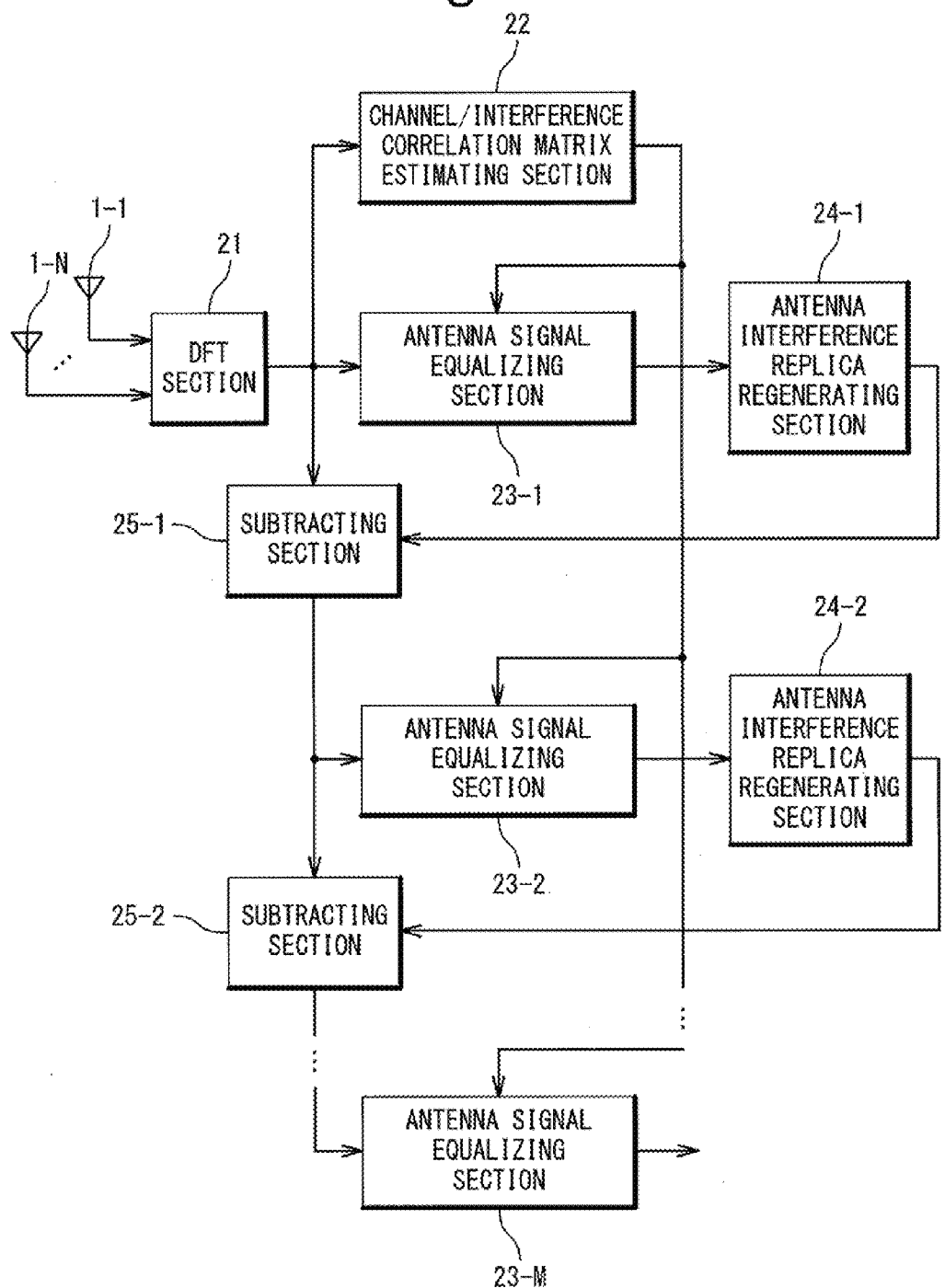
FIG. 10 is a block diagram showing of the receiving apparatus according to a second exemplary embodiment of the present invention.

FIG. 10 is a block diagram showing a configuration of the receiving apparatus according to the second exemplary embodiment of the present invention. In the receiving apparatus of the present invention, the SC-MIMO signals transmitted from M (M is the integer of 2 or more) antennas are received by N (N is the integer of 2 or more) antennas, and the MIMO signal separation is carried out by a signal process in the frequency domain while the multipath equalization and the other cell interference suppression are carried out. The receiving apparatus contains the reception antennas 1-1 to 1-N, a DFT section 21, a channel/interference correlation matrix estimating section 22, antenna signal equalizing sections 23-1 to 23-M, antenna interference replica reproducing sections 24-1 to 24-(M−1), and subtracting sections 25-1 to 25-(M−1).

The reception antennas 1-1 to 1-N are connected to the DFT section 21. The DFT section 21 is connected to the channel/interference correlation matrix estimating section 22, the antenna signal equalizing section 23-1 and the subtracting section 25-1. The channel/interference correlation matrix estimating section 22 is connected to each of the antenna signal equalizing sections 23-1 to 23-M. The antenna signal equalizing sections 23-1 to 23-(M−1) are connected to the antenna interference replica reproducing sections 24-1 to 24-(M−1), respectively. The antenna interference replica reproducing sections 24-1 to 24-(M−1) are connected to the subtracting sections 25-1 to 25-(M−1), respectively. The subtracting sections 25-1 to 25-(M−2) are connected to the subtracting sections 25-2 to 25-(M−1), respectively and sequentially. The subtracting sections 25-1 to 25-(M−1) are connected to the antenna signal equalizing sections 23-2 to 23-M.

The receiving apparatus of the present, invention is based on the MMSE-SIC system. A transmission antenna signal number M' decreased after the antenna interference removal is sequentially performed. Thus, in case of N>M', the other cell interference suppression effect is obtained. In the present invention, the correlation matrix used in the equalization weight calculation is separated into the correlation matrix determined from the channel estimation values of all the transmission antenna signals remaining after the antenna interference removal and the interference correlation matrix determined by subtracting the replica of all the transmission antenna signals from the reception signals.

Each of the reception antennas 1-1 to 1-N receives the SC signal. The DFT section 21 receives the reception signals of the reception antennas 1-1 to 1-N and carries out the DFT processes of the $N_{DFT}$ points ($N_{DFT}$ is the integer of 2 or more) and outputs the reception signals transformed into the frequency domain. The channel/correlation matrix estimating section 22 uses the pilot signals inserted for each transmission antenna to estimate the channel gains between the transmission antenna and the reception antenna, subtracts the replicas of all the transmission antenna signals from the pilot reception signals and then estimates the interference correlation matrix. The antenna signal equalizing sections 23-1 to 23-M equalize the reception signals in the frequency domain in accordance with the weights, which are calculated from the channel estimation values of all the transmission antenna signals remaining after the antenna interference removal, and the interference correlation matrix, in the order from the transmission antenna signals of a higher level. The antenna interference replica reproducing sections 24-1 to 24-(M−1) generate the interference replicas of the transmission antenna signals. The subtracting sections 25-1 to 25-(M−1) subtract the antenna interference replicas from the output (only the initial interference removal) of the DFT section 21 that is the output from which the previous transmission antenna signals are subtracted or the outputs of the subtracting sections 25-1 to 25-(M−1).

Figure 11:
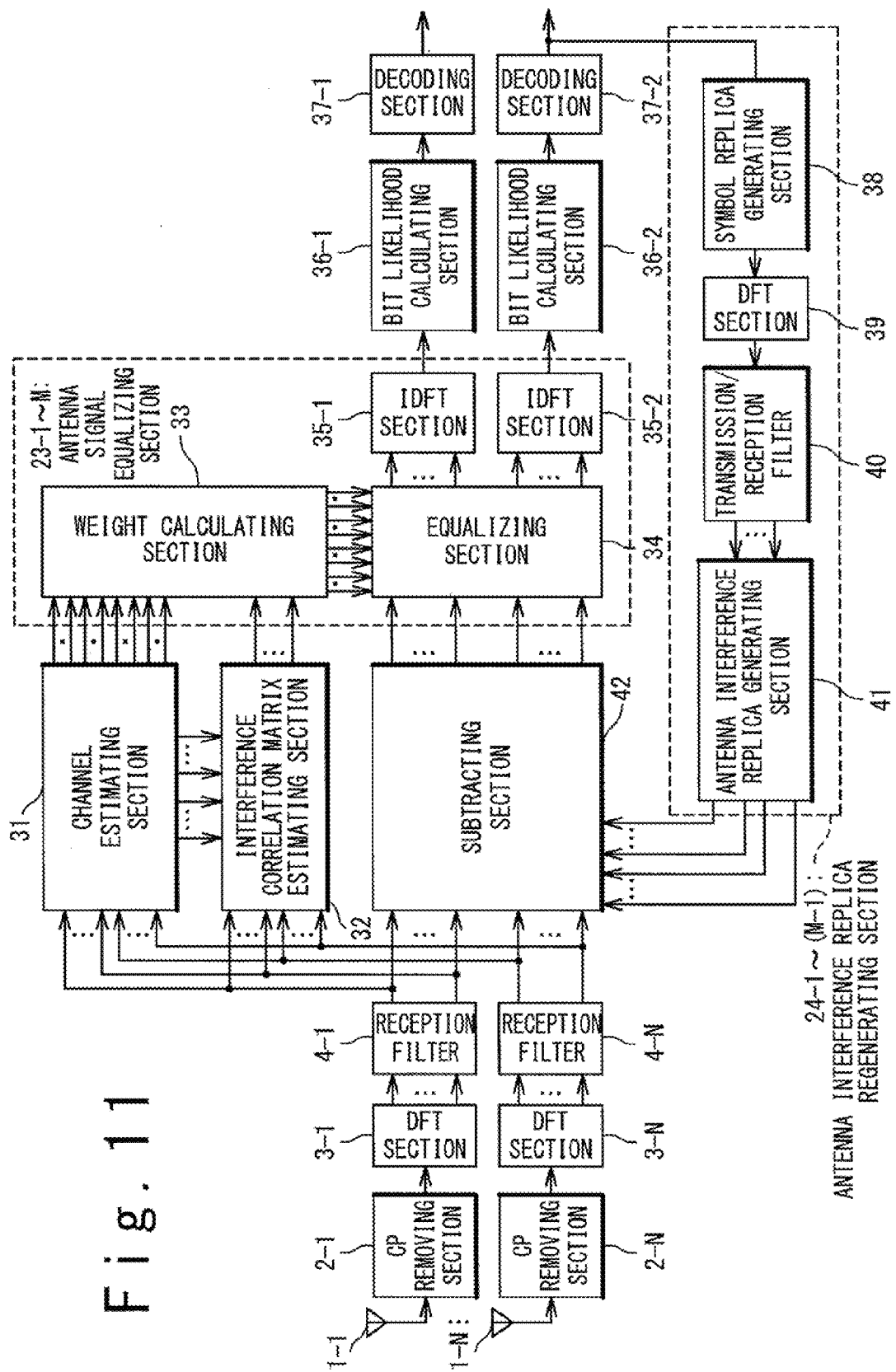
FIG. 11 is a block diagram showing the operations of the receiving apparatus of the present invention.

The detailed operation of this exemplary embodiment will be described below with reference to FIG. 11. FIG. 11 shows a case of M=2, in order to simplify the description. The receiving apparatus of the present invention contains the reception antennas 1-1 to 1-N, the CP removing sections 2-1 to 2-N, the DFT sections 3-1 to 3-N, the reception filters 4-1 to 4-N, a channel estimating section 31, an interference correlation matrix estimating section 32, an weight calculating section 33, an equalizing section 34, IDFT sections 35-1 and 35-2, bit likelihood calculating sections 36-1 and 36-2, decoding sections 37-1 and 37-2, a symbol replica generating section 38, a DFT section 39, a transmission/reception filter 40, an antenna interference replica generating section 41 and a subtracting section 42. It should be noted that for the convenience, the combination of the weight calculating section 33, the equalizing section 34 and the IDFT sections 35-1 and 35-2 are referred to as antenna signal equalizing sections 23-1 to 23-M. Similarly, a combination of the symbol replica generating section 38, the DFT section 39, the transmission/reception filter 40 and the antenna interference replica generating section 41 are referred to as antenna interference replica reproducing sect ions 24-1 to 24-(M−1).

The reception antennas 1-1 to 1-N are connected to the CP removing sections 2-1 to 2-N, respectively. The CP removing sections 2-1 to 2-N are connected to the DFT sections 3-1 to 3-N, respectively. The DFT sections 3-1 to 3-N are connected to the reception filters 4-1 to 4-N, respectively. The reception filters 4-1 to 4-N are connected to the channel estimating section 31, the interference correlation matrix estimating section 32 and the subtracting section 42. The channel estimating section 31 is connected to the interference correlation matrix estimating section 32 and the weight calculating section 33. The interference correlation matrix estimating section 32 is connected to the weight calculating section 33. The weight calculating section 33 is connected to the equalizing section 34. The equalizing section 34 is connected to the IDFT sections 35-1 and 35-2. The IDFT sections 35-1 and 35-2 are connected to the bit likelihood calculating sections 36-1 and 36-2, respectively. The bit likelihood calculating sections 36-1 and 36-2 are connected to the decoding sections 37-1 and 37-2, respectively. The decoder 37-2 is connected to the symbol replica generating section 38, respectively. The symbol replica generating section 38 is connected to the DFT section 39. The DFT section 39 is connected to the transmission/reception filter 40. The transmission/reception filter 40 is connected to the antenna interference replica generating section 41. The antenna interference replica generating section 41 is connected to the subtracting section 42. The subtracting section 42 is connected to the equalizing section 34.

Each of the reception antennas 1-1 to 1-N receives the SC signal. The CP removing sections 2-1 to 2-N receive the reception signals of the respective antennas and remove the signal portions corresponding to the CP portions. The DFT sections 3-1 to 3-N receive the reception signals from which the CP potions are removed by the CP removing sections 2-1 to 2-N, and carry out the DFT processes of $N_{DFT1}$ points ($N_{DFT1}$ is an integer of 2 or more) and output the reception signals transformed into the frequency domain. The reception filters 4-1 to 4-N carry out the bandwidth limitations of the reception signals in the frequency domain and carry out the user separation and the noise suppression. Typically, the raised cosine roll-off filters (including the roll-off rate 0) are used in the reception filters 4-1 to 4-N. However, they are not limited thereto. In the configuration of FIG. 11, the filtering of the reception signals is carried out in a signal process in the frequency domain. However, it may be carried out in the signal process in the time domain prior to the DFT sections 3-1 to 3-N.

The channel estimating section 31 uses the pilot signal inserted for each transmission antenna and estimates a channel gain between the transmission antenna and the reception antenna through a correlating process between the pilot reception signals and the pilot reference frequency domain signals. The configuration of the portion corresponding to each transmission antenna signal by the channel estimating section 31 is similar to the channel estimating section 5 in the first exemplary embodiment.

The interference correlation matrix estimating section 32 estimates the interference correlation matrix from the channel estimation values of all the transmission antenna signals and the pilot reception frequency domain signals. The configuration of the interference correlation matrix estimating section 32 is substantially similar to the interference correlation matrix estimating section 6 in the first exemplary embodiment. However, the difference is in that the pilot signal replicas of all the transmission antenna signals are subtracted from the pilot reception signals. The interference correlation matrix $R_f(k)$ ($1 \cdot k \cdot N_{DFT}$) is calculated by the following equation by using the pilot reception signal vector P(k), the channel estimation value vector $H_m(k)$ of the transmission antenna m, the pilot code characteristics $C_m(k)$ of the transmission antenna m, the subcarrier number $N_{CB}$ corresponding to the coherent bandwidth, and the transmission antenna number M:

$$R_I(k) = \frac{1}{N_{CB}} \sum_{i=k-(N_{CB}-1)/2}^{k+(N_{CB}-1)/2} \left[ P(i) - \sum_{m=1}^{M} H_m C_m(i) \right] \left[ P(i) - \sum_{m=1}^{M} H_m C_m(i) \right]^H \quad (8)$$

The channel estimation values of all the transmission antenna signals remaining after the antenna interference removal and the interference correlation matrix sire supplied to the weight calculating section 33, and the equalization weights are calculated. The MMSE weights $W_m(k)$ ($1 \cdot k \cdot N_{DFT1}$) in the subcarrier k of the transmission antenna m are calculated by the following equation by using the channel estimation value vector $H_m(k)$, the correlation matrix $R(k)$, the interference correlation matrix $R_I(k)$ and the transmission antenna signal number M':

$$R(k) = \sum_{m=1}^{M'} H_m(k) H_m^H(k) + R_I(k) \quad (9a)$$

$$W_m(k) = H_m^H(k) R^{-1}(k) \quad (9b)$$

$$= H_m^H(k) \left[ \sum_{m=1}^{M'} H_m(k) H_m^H(k) + R_I(k) \right]^{-1} \quad (9c)$$

Here, in case of NM and when the first transmission antenna signal of the MMSE-SIC system is demodulated (M'=M), a degree of freedom (interference suppression performance) of the reception antenna is short. Therefore, the other cell interference suppression effect cannot be expected. For this reason, instead of the interference correlation matrix $R_I(k)$, the noise power matrix $\sigma^2 I$ having a high subcarrier averaging effect, is used, resulting in the characteristics improvement. In the MMSE-SIC system, the demodulating process is carried out in an order from the transmission antenna signals of the higher level. In the ranking of the transmission antenna signals, for example, the average values of the post-equalization channel gains are used. An average value Ave ($H_m$) of the post-equalization channel gains is calculated by the following equation.

$$Ave(H_m) = \frac{1}{N_{DFT}} \sum_{k=1}^{N} W_m(k) H_m(k) \quad (10)$$

In case of M=2, when the level of the transmission antenna 2 is determined to be high as the result of the ranking, the equalization weight $W_1(k)$ of the transmission antenna 1 is calculated as M'=2 in the equation (9). An equalization weight $W_2(k)$ of the transmission antenna 2 and the data reception signal vector D(k) of the outputs of the reception filters 4-1 to 4-N are supplied to the equalizing section 34. Then, they are multiplied for each subcarrier. Thus, the multipath equalization of the reception signals and the antenna diversity combining are carried out in the frequency domain. An equalization signal $Y_2(k)$ ($1 \cdot k \cdot N_{DFT}$) of the output of the equalizing section 34 is represented by the following equation:

$$Y_2(k) = W_2(k) D(k) \quad (11)$$

The IDFT section 35-2 receives the equalization frequency domain signal, carries out the IDFT processes of points ($N_{IDFT}$ is an integer of 2 or more), and transforms into a signal in the time domain and then outputs a demodulation signal of the transmission antenna 2.

The bit likelihood calculating section 36-2 calculates a likelihood for each bit transmitted by the demodulation signal of the transmission antenna 2. The decoding section 37-2 receives a bit likelihood and carries out an error correction decoding. A turbo code and a convolution code are used for an error correction code. The symbol replica generating section 38 generates a symbol replica from the decoding signal of the transmission antenna 2. The symbol replica generating section 38 uses a method of generating a hard decision symbol replica, a method of generating the hard decision symbol replica and multiplying a predetermined replica weight coefficient (a constant of 1 or less), and a method of generating a soft decision symbol replica. Among them, typically, the performance of the method of generating the soft decision symbol replica is good. Also, there is a method of carrying out an error detection of a coding block and generating the hard decision symbol replica only when there is not any block error. The symbol replica generated by the symbol replica generating section 38 is supplied to the DFT section 39, and the DFT processes of $N_{DFT2}$ ($N_{DFT2}$ is an integer of 2 or more) points are carried out, and the symbol replica is transformed into a frequency domain signal. The transmission/reception filter 40 passes the signal of the symbol replica in the frequency domain. The transmission/reception filter 40 is not required in case of the roll-off rate 0. The antenna interference replica generating section 41 uses the symbol replica frequency domain signal and the channel estimation value and generates the antenna interference replica. The subtracting section 42 subtracts the antenna interference replica of the transmission antenna 2 from the reception signals whose bandwidth is limited by the reception filters 4-1 to 4-N. When the symbol replica of the transmission antenna 2 in the frequency domain is defined as $S_2(k)$ and the channel estimation value is defined as $H_2(k)$, an output D'(k) ($1 \leq k \leq N_{DFT}$) of the subtracting section 42 is calculated by the following equation:

$$D'(k) = D(k) \ldots H_2(k) S_2(k) \quad (12)$$

Next, in order to demodulate the signal of the transmission antenna 1, the weight calculating section 33 calculates the equalization weights of the transmission antenna 1. The equalization weight $W_1(k)$ of the transmission antenna 1 is calculated under an assumption of M'=1 in the equation (9). The equalization weight $W_1(k)$ of the transmission antenna 1 and the output D'(k) of the subtracting section 41 are supplied to the equalizing section 34. Then, they are multiplied for each subcarrier. Thus, the multipath equalization of the reception signals and the other cell interference suppression are carried out in the frequency domain. Equalization signals $Y_1(k)$ ($1 \leq k \leq N_{DFT}$) outputted from the equalizing section 34 are represented by the following equation:

$$Y_1(k) = W_1(k) D'(k) \quad (13)$$

The IDFT section 35-1 receives the equalization signals in the frequency domain and carries out the IDFT processes of the $N_{IDFT}$ points ($N_{IDFT}$ is the integer of 2 or more) and transforms into the signal in the time domain and then outputs the demodulation signal of the transmission antenna 1. The bit likelihood calculating section 36-1 calculates the likelihood for each bit transmitted by the demodulation signal of the transmission antenna 1. The decoding section 37-1 receives the bit likelihood and carries out error correction decoding.

In the receiving apparatus of this exemplary embodiment, the correlation matrix used in the equalization weight calculation is calculated by separating into the correlation matrix determined from the channel estimation values of all the transmission antenna signals remaining after the antenna interference removal and the interference correlation matrix determined by subtracting the replicas of sill the transmission antenna signals from the reception signals. Thus, since the multipath equalization and the other cell interference suppression can be carried out at a same time in the frequency domain, the superior reception performance is achieved. Also, M' is gradually decreased through a sequential process for the antenna interference removal. Therefore, in case of N>M', the other cell interference suppression effect is obtained.

Figure 12:
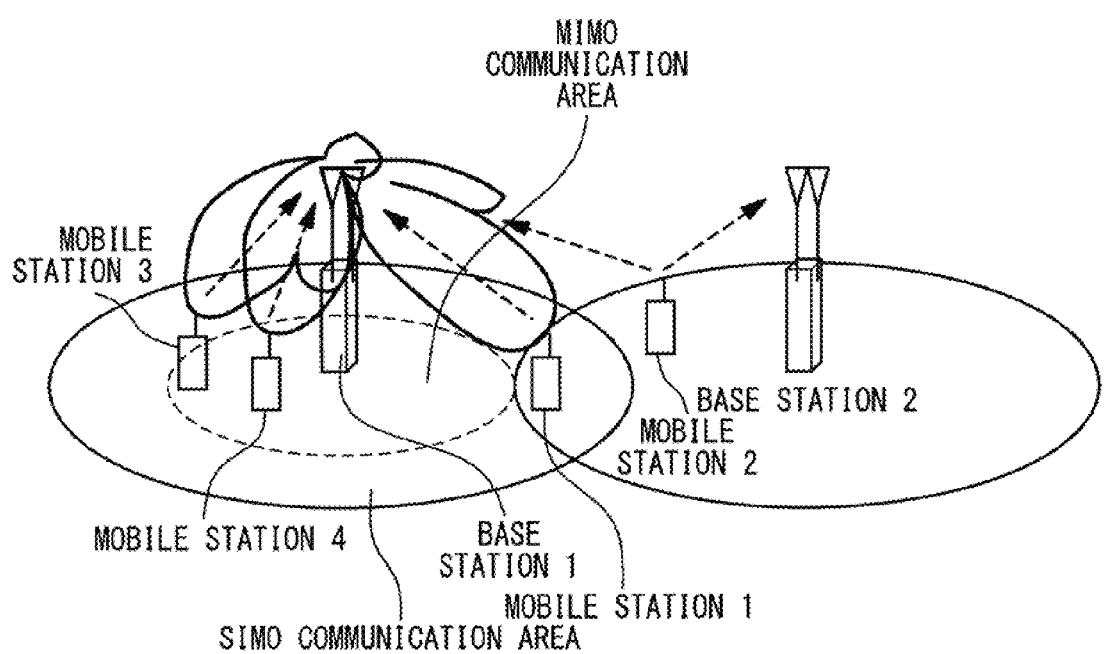
FIG. 12 is a diagram showing another mobile communication system that uses the receiving apparatus of the present invention.

FIG. 12 is a diagram showing the mobile communication system that uses the receiving apparatus in this exemplary embodiment. In the uplink of the mobile communication system, the mobile station 1 is connected to the base station 1, and the SIMO communication is carried out in accordance with the SC system (FIG. 8). However, in the area in which a transmission path or a reception quality is superior (namely, in the area near the base station), the MIMO communication is further executed, to permit the improvement of a transmission rate or system throughput. Here, the trial of the MIMO communication at a cell edge is not preferable because a coverage is contracted and a severe interference is given to another cell. A mobile station 3 and a mobile station 4 are connected to the base station 1, and the MIMO communication is carried out in accordance with the SC system. In this way, the system in which the transmission antenna signals from the plurality of mobile stations are tied into bundles and the MIMO communication is carried out is referred to as a multiuser MIMO. When the base station 1 receives the signal of the mobile station 3 or mobile station 4, the signal of the mobile station 2 that is connected to the base station 2 in the adjacent cell and carries out the communication by using the same frequency channel, resulting in the interference. When the base station 1 uses the receiving apparatus in this exemplary embodiment in receiving the signals of the mobile station 3 and the mobile station 4 and consequently tries to receive the signal of the mobile station 4 after the removal of the antenna interference replica of the mobile station 3, the interference of the mobile station 2 is suppressed when the signal of the mobile station 4 is received. Typically, in the WISE, when the number of the reception antennas in the base station is defined as N and the number of the transmission antenna signals remaining after the antenna interference replica removal is defined as M', the interference of the mobile stations in the (N-M') other cells can be suppressed. It should be noted that the receiving apparatus in this exemplary embodiment can be used in any of the single user MIMO and the multiuser MIMO.

In the first and second exemplary embodiments, the transformation from the time domain signal into the frequency domain signal is carried out by the DFT process, and the transformation from the frequency domain signal into the time domain signal is carried out by the IDFT process, respectively. However, a fast Fourier transformation (FFT) or an inverse fast Fourier transformation (IFFT) or another algorism may be used.

In the receiving apparatus in the present invention, the correlation matrix used in the equalization weight calculation is calculated by separating into the correlation matrix determined from the channel estimation values of the desired user signal and the interference correlation matrix determined by subtracting the replicas of the desired user signal from the reception signals. Thus, since the multipath equalization and the other cell interference suppression can be carried out at the same time in the frequency domain, the superior reception performance is achieved.

The invention claimed is:

1. A mobile communication system comprising:
   a plurality of mobile stations; and
   a base station which is simultaneously communicable with said plurality of mobile stations in an SC (Single Carrier) system,
   wherein said base station comprises a first receiving apparatus configured to perform SIMO (Single Input Multiple Output) communicate with a desired one of said plurality of mobile stations,
   said first receiving apparatus comprises:
   first front stage function sections configured to receive SC signals from said plurality of mobile stations and to output frequency domain signals separated respectively from the received signals from said plurality of mobile stations;
   a first channel estimating section configured to estimate a channel gain of each of said frequency domain signals;
   a first interference correlation matrix estimating section configured to estimate an interference correlation matrix based on said frequency domain signals and estimation values of said channel gains;
   a first back stage function section configured to output a demodulation signal based on said channel gain estimation values and said estimated interference correlation matrix;
   a weight calculating section configured to calculate equalization weights based on said channel gain estimation values and said estimated interference correlation matrix; and
   a noise estimating section configured to estimate noise power based on said pilot reception signal and said channel gain estimation values,
   wherein said weight calculating section selects one of said interference correlation matrix and said noise power based on a magnitude of the interference.

2. The mobile communication system according to claim 1, wherein said first interference correlation matrix estimating section comprises:
   a DFT (Discrete Fourier Transform) section configured to convert a pilot code corresponding to the desired mobile station into said frequency domain signal;
   a transmission/reception filter configured to limit a bandwidth of said frequency domain signal;
   a pilot signal replica generating section configured to generate a pilot signal replica by multiplying an output of said transmission/reception filter and said channel gain estimation values;
   a subtracting section configured to subtract said pilot signal replica from a pilot reception signal corresponding to the received signal;
   a correlation matrix calculating section configured to calculate a first correlation matrix from an output of said subtracting section; and
   a subcarrier averaging section configured to average each element of said correlation matrix over subcarriers.

3. The mobile communication system according to claim 2, wherein said first interference correlation matrix estimating section generates said interference correlation matrix $R_I(k)$ in said subcarrier k to satisfy the following equation:

$$R_I(k) = \frac{1}{N_{CB}} \sum_{i=k-(N_{CB}-1)/2}^{k+(N_{CB}-1)/2} [P(i) - H(i)C(i)][P(i) - H(i)C(i)]^H$$

where said pilot reception signals, said channel gain estimation values, a characteristic of said pilot code, and a number of subcarriers in said subcarrier k ($1 \leq k \leq N_{DFT}$) are P(k), H(k), C(k), $N_{CB}$ ($N_{CB}$ is an integer equal to or more than 2), respectively.

4. The mobile communication system according to claim 3, wherein said first channel estimating section comprises:
   a pilot reference signal generating section configured to generate a pilot reference signal corresponding to said desired mobile station in the frequency domain based on the pilot code characteristic;
   a correlation calculating section configured to estimate the channel gain for the SC signal from said desired mobile station through correlation calculation between the pilot reception signal and said pilot reference signal in the frequency domain; and
   a noise suppressing section configured to suppress noise of said channel gain estimation values.

5. The mobile communication system according to claim 1, wherein each of said first front stage function sections comprises:
   an antenna configured to receive the SC signals from said plurality of mobile stations;
   a CP removing section configured to remove CP (Cyclic Prefix) from the received SC signals;
   a DFT section configured to convert the SC signals with CP removed into the frequency domain signals; and
   a reception filter section configured to separate the frequency domain signals in units of mobile stations.

6. The mobile communication system according to claim 1, wherein said weight calculating section is a first weight calculating section, and said first back stage function section further comprises:
   an equalizing section configured to output equalization signals based on said frequency domain signals and the equalization weights; and
   an IDFT section configured to convert said equalization signals into a time domain signal.

7. The mobile communication system according to claim 6, wherein said first weight calculating section calculates a second correlation matrix used in calculation of said equalization weights based on a first correlation matrix determined from a channel estimation value of a desired user signal and the interference correlation matrix.

8. The mobile communication system according to claim 7, wherein said first weight calculating section generates said second correlation matrix R(k) in the subcarrier k to satisfy the following equation:

$$R(k) = H(k)H^H(k) + R_I(k)$$

wherein the channel estimation values of the desired user signal and said estimated interference correlation matrix in the subcarrier k ($1 \leq k \leq N_{DFT}$) are H(k) and $R_I(k)$, respectively.

9. The mobile communication system according to claim 7, wherein said first receiving apparatus comprises:
   wherein said first weight calculating section selects one of said interference correlation matrix and said noise power based on a magnitude of the interference, when the second correlation matrix used in said equalization weight calculation is calculated based on the first correlation matrix determined from said channel estimation values and said estimated interference correlation matrix or said noise power.

10. The mobile communication system according to claim 1, wherein said base station further comprises:

a second receiving apparatus configured to communicate with said desired mobile station of said plurality of mobile stations in MIMO (Multiple Input Multiple Output),
wherein said second receiving apparatus comprises:
   second front stage function sections configured to receive SC-MIMO signals transmitted from a plurality of transmission antennas and to output frequency domain signals separated from the received signal in units of transmission antennas;
   a second channel estimating section configured to estimate said channel gain for each of said frequency domain signals;
   a second interference correlation matrix estimating section configured to estimate said interference correlation matrix based on said frequency domain signals and channel gain estimation values; and
   a second back stage function section configured to output a demodulation signal based on said frequency domain signals, said channel gain estimation values and said estimated interference correlation matrix.

11. The mobile communication system according to claim 10, wherein said second interference correlation matrix estimating section comprises:
   a DFT section configured to convert pilot codes corresponding to all of said plurality of transmission antennas into said frequency domain signals;
   a transmission/reception filter to limit bandwidths of said frequency domain signals;
   a pilot signal replica generating section configured to generate a pilot signal replica by multiplying an output of said transmission/reception filter and said channel gain estimation values;
   a subtracting section configured to subtract said pilot signal replica from said pilot reception signals corresponding to said received signals;
   a correlation matrix calculating section configured to calculate said correlation matrix from an output of said subtracting section; and
   a subcarrier averaging section configured to average each element of said correlation matrix over said plurality of subcarriers.

12. The mobile communication system according to claim 11, wherein said second interference correlation matrix estimating section generates said interference correlation matrix $R_I(k)$ of said subcarrier k to satisfy the following equation:

$$R_I(k) = \frac{1}{N_{CB}} \sum_{i=k-(N_{CB}-1)/2}^{k+(N_{CB}-1)/2} \left[ P(i) - \sum_{m=1}^{M} H_m C_m(i) \right] \left[ P(i) - \sum_{m=1}^{M} H_m C_m(i) \right]^H$$

where said pilot reception signal, the channel estimation value of transmission antenna m, the characteristic of the pilot code of said transmission antenna m, the number of the subcarriers and the number of said plurality of transmission antennas at the subcarrier k ($1 \leq k \leq N_{DFT}$) are P(k), Hm(k), Cm(k), $N_{CB}$ ($N_{CB}$ is an integer equal to or more than 2), and M, respectively.

13. The mobile communication system according to claim 10, wherein said second channel estimating section comprises:
   a pilot reference signal generating section configured to generate said pilot reference signal corresponding to a desired transmission antenna in the frequency domain based on the pilot code characteristic;

a correlation calculating section configured to estimate the channel gain of the SC-MIMO signals from said desired mobile station through calculation of the correlation between the pilot reception signals and said pilot reference signals in the frequency domain; and a noise suppressing section configured to suppress noise of said channel gain estimation values.

14. The mobile communication system according to claim 10, wherein each of said second front stage function sections comprises:

an antenna configured to receive the SC-MIMO signals transmitted from said plurality of transmission antennas;

a CP removing section configured to remove CP from the received SC-MIMO signal;

a DFT section configured to convert the SC-MIMO signals with the CP removed into said frequency domain signals; and a reception filter section configured to separate the frequency domain signals for every transmission antenna.

15. The mobile communication system according to claim 10, wherein said second back stage function section comprises:

an antenna interference replica replay section configured to generate an antenna interference replica of said transmission antenna signals based on said demodulation signal;

a subtracting section configured to subtract said antenna interference replica from said plurality of frequency domain signals;

a second weight calculating section configured to calculate equalization weights based on said channel gain estimation values and said estimated interference correlation matrix;

an equalizing section configured to output equalization signals based on the result of said subtraction and said equalization weights; and an IDFT section configured to convert said equalization signals into said time domain signals.

16. The mobile communication system according to claim 15, wherein said second weight calculating section calculates a second correlation matrix used in the calculation of said equalization weights based on a first correlation matrix found from the channel estimation values of all of the transmission antenna signals remaining after the antenna interference removal and the interference correlation matrix.

17. The mobile communication system according to claim 16, wherein said second weight calculating section generates said correlation matrix R(k) in said subcarrier k to satisfy the following equation:

$$R(k) = \sum_{m=1}^{M'} H_m(k) H_m^H(k) + R_I(k)$$

where the channel estimation values of all the transmission antenna signals remaining after the antenna interference removal, the interference correlation matrix, and the number of transmission antennas in said subcarrier k ($1 \leq k \leq N_{DFT}$) are H(k), $R_I(k)$, and M', respectively.

18. The mobile communication system according to claim 16, wherein said second receiving apparatus further comprises:

a noise estimating section configured to estimate noise power from said pilot reception signal and said channel estimation values, and said second weight calculating section selects one of said interference correlation matrix and said noise power based on the interference, when calculating the second correlation matrix used in the calculation of said equalization weights based on the first correlation matrix determined from the channel estimation value and the interference correlation matrix or the noise power.

19. The mobile communication system according to claim 16, wherein said second receiving apparatus further comprises:

a noise estimating section configured to estimate noise power from said pilot reception signal and said channel estimation values, and wherein said second weight calculating section selects one of said interference correlation matrix and said noise power based on the number of transmission antenna signals remaining after the antenna interference removal, when calculating the second correlation matrix used in the calculation of said equalization weights based on the first correlation matrix determined from the channel estimation value and the interference correlation matrix or the noise power.

20. The mobile communication system according to claim 10, wherein said second receiving apparatus performs MIMO communication with said desired mobile station in an area where a propagation path to said desired mobile station or reception quality from said desired mobile station is good.

21. A receiving apparatus which performs SIMO (Single Input Multiple Output) communicate with a desired one of said plurality of mobile stations, said receiving apparatus comprising:

first front stage function sections configured to receive SC signals from said plurality of mobile stations and to output frequency domain signals generated respectively from the received signals from said plurality of mobile stations;

a first channel estimating section configured to estimate a channel gain of each of said frequency domain signals;

a first interference correlation matrix estimating section configured to estimate an interference correlation matrix based on said frequency domain signals and estimation values of said channel gains;

a first back stage function section configured to output a demodulation signal based on said channel gain estimation values and said estimated interference correlation matrix;

a weight calculating section configured to calculate equalization weights based on said channel gain estimation values and said estimated interference correlation matrix; and a noise estimating section configured to estimate noise power based on said pilot reception signal and said channel gain estimation values, wherein said weight calculating section selects one of said interference correlation matrix and said noise power based on a magnitude of the interference.

22. A receiving apparatus which communicates with said desired mobile station of said plurality of mobile stations in MIMO (Multiple Input Multiple Output), said receiving apparatus comprises:

second front stage function sections configured to receive SC-MIMO signals transmitted from a plurality of transmission antennas and to output frequency domain signals separated from the received signal in units of transmission antennas;

a second channel estimating section configured to estimate said channel gain for each of said frequency domain signals;

a second interference correlation matrix estimating section configured to estimate said interference correlation matrix based on said frequency domain signals and channel gain estimation values; and a second back stage function section configured to output a demodulation signal based on said frequency domain signals, said channel gain estimation values and said estimated interference correlation matrix;

a weight calculating section configured to calculate equalization weights based on said channel gain estimation values and said estimated interference correlation matrix; and a noise estimating section configured to estimate noise power based on said pilot reception signal and said channel gain estimation values, wherein said weight calculating section selects one of said interference correlation matrix and said noise power based on a magnitude of the interference.

23. A mobile communication method comprising:

(a) a base station performing SIMO communication with a desired user mobile station by using a first or second receiving method; and (b) a plurality of user mobile stations simultaneously communicating with said base station by using an SC method, wherein said first receiving method comprises:

receiving an SC signal by a plurality of receiving antennas;

converting the received signals into frequency domain signals;

estimating a channel gain of a user signal by using pilot reception signals;

estimating an interference correlation matrix from said pilot reception signals and channel gain estimation values;

receiving said channel gain estimation values and said interference correlation matrix to calculate equalization weights;

carrying out multipath equalization and interference suppression of said user signal to output equalization signals;

converting said equalization signals into time domain signals;

calculating equalization weights based on said channel gain estimation values and said estimated interference correlation matrix;

estimating noise power based on said pilot reception signal and said channel gain estimation values; and selecting one of said interference correlation matrix and said noise power based on a magnitude of the interference.

24. The mobile communication method according to claim 23, wherein said second receiving method comprises:

receiving SC-MIMO signals transmitted from a plurality of transmission antennas;

converting the received signals into frequency domain signals;

estimating channel gains of all transmission antenna signals by using pilot reception signals;

estimating an interference correlation matrix from the pilot reception signals and channel estimation values;

receiving said channel estimation values and said interference correlation matrix to calculate equalization weights;

carrying out multipath equalization and interference suppression of said transmission antenna signals having large level;

converting equalization signals into time domain signals;

generating an antenna interference replica of the transmission antenna signals; and subtracting said antenna interference replica from an output of said transmission antenna signal after the subtraction.

25. The mobile communication method according to claim 24, wherein in said second receiving method, a MIMO communication with said desired mobile station is carried out in an area where transmission paths to said desired mobile station or reception qualities from said desired mobile station are good.

* * * * *